US012107873B2

(12) United States Patent
Li et al.

(10) Patent No.: US 12,107,873 B2
(45) Date of Patent: Oct. 1, 2024

(54) BLOCKCHAIN-BASED INTRUSION DETECTION SYSTEM FOR RAILWAY SIGNALS

(71) Applicants: Signal and Communication Research Institute, China Academy of Railway Sciences Corporation Ltd., Beijing (CN); China Academy of Railway Sciences Corporation Ltd., Beijing (CN); Beijing Huatie Information Technology Corporation Ltd., Beijing (CN); Beijing Ruichi Guotie ITS Eng.&Tech. Ltd., Beijing (CN)

(72) Inventors: Qichang Li, Beijing (CN); Ran Zhao, Beijing (CN); Bingyue Lin, Beijing (CN); Hua Zhang, Beijing (CN); Gang Li, Beijing (CN); Yingying Cui, Beijing (CN); Lin Wang, Beijing (CN); Deji Fu, Beijing (CN); Fei Wang, Beijing (CN); Zibiao Fu, Beijing (CN); Fei Wang, Beijing (CN); Yazhou Kou, Beijing (CN); Jiali Zhao, Beijing (CN); Qiang Gao, Beijing (CN); Xianfeng Luan, Beijing (CN); Hui Zhang, Beijing (CN); Gang Zhao, Beijing (CN); Shi Yan, Beijing (CN); Hao Chang, Beijing (CN); Chaoping Zhu, Beijing (CN); Zhenzhen Liu, Beijing (CN); Zhiduo Xie, Beijing (CN); Yong Yang, Beijing (CN); Yuan Ma, Beijing (CN); Qizheng Hu, Beijing (CN)

(73) Assignees: Signal and Communication Research Institute, China Academy of Railway Sciences Corporation Ltd., Beijing (CN); China Academy of Railway Sciences Corporation Ltd., Beijing (CN); Beijing Huatie Information Technology Corporation Ltd., Beijing (CN); Beijing Ruichi Guotie ITS Eng. & Tech. Ltd., Beijing (CN)

( * ) Notice: Subject to any disclaimer, the term of this patent is extended or adjusted under 35 U.S.C. 154(b) by 0 days.

(21) Appl. No.: 18/401,368
(22) Filed: Dec. 30, 2023
(65) Prior Publication Data
  US 2024/0283801 A1   Aug. 22, 2024
(30) Foreign Application Priority Data
  Feb. 20, 2023   (CN) .......................... 202310138551.3

(51) Int. Cl.
  *H04L 67/12*   (2022.01)
  *H04L 9/40*    (2022.01)
(52) U.S. Cl.
  CPC .......... *H04L 63/1416* (2013.01); *H04L 67/12* (2013.01)
(58) Field of Classification Search
  USPC ................................................ 726/23
  See application file for complete search history.

(56) References Cited

U.S. PATENT DOCUMENTS 11,729,186 B2 *  8/2023  Ajayi ................. G06F 16/2379
                                                          726/23
2016/0359697 A1 * 12/2016  Scheib .................... H04L 67/01
(Continued)

FOREIGN PATENT DOCUMENTS

CN       101217396 B    *    8/2010
CN       112153047 A         12/2020
(Continued)

OTHER PUBLICATIONS

Lu et al, "An Improved Intrusion Detection Scheme based on Weighted Trust Evaluation for Wireless Sensor Networks", Dec. 30, 2010, IEEE Xplore, pp. 1-6 (Year: 2010).*
(Continued)

*Primary Examiner* — Sakinah White Taylor

(57) ABSTRACT

The invention discloses a blockchain-based intrusion detection system for railway signal, which is built on a block-
(Continued)

chain's distributed chain structure, without a central, trusted control center. This design mitigates the vulnerabilities associated with centralized intrusion detection centers. Additionally, by utilizing a blockchain-based distributed structure, it also eliminates the risk of a single point of failure for the intrusion detection center. Moreover, the data within the blockchain-based intrusion detection system is highly resistant to malicious tampering. This is achieved by leveraging the consensus mechanism inherent in the blockchain, which can achieve consensus among intrusion detection nodes. The current invention solves the internal evil attacks and avoid the inability to reach consensus between nodes due to internal evil, thereby affecting the intrusion detection performance; at the same time, the intrusion detection model can resist external network attacks.

15 Claims, 4 Drawing Sheets

(56) References Cited

U.S. PATENT DOCUMENTS

| | | | |
|---|---|---|---|
| 2019/0096210 A1 | 3/2019 | Jarvis et al. | |
| 2020/0012935 A1* | 1/2020 | Goodsitt | G06F 18/22 |
| 2020/0112572 A1 | 4/2020 | Ajayi et al. | |
| 2020/0278958 A1* | 9/2020 | Zhang | G06Q 20/3678 |
| 2022/0094702 A1* | 3/2022 | Saad Ahmed | H04L 63/1416 |
| 2023/0007032 A1 | 1/2023 | Kong et al. | |

(56) References Cited

FOREIGN PATENT DOCUMENTS

| | | | | |
|---|---|---|---|---|
| CN | 112770291 A | | 5/2021 | |
| CN | 114826698 A | | 7/2022 | |
| CN | 115242559 A | | 10/2022 | |
| CN | 115378711 A | * | 11/2022 | |
| WO | WO-2021098313 A1 | * | 5/2021 | G06F 16/27 |

OTHER PUBLICATIONS

Kagade et al, "Optimization assisted deep learning based intrusion detection system in wireless sensor network with two-tier trust evaluation", Wiley, pp. 1-17 (Year: 2021).*

Notice of Allowance of counterpart Chinese Patent Application No. 202310138551.3 issued on May 9, 2023.

* cited by examiner

BLOCKCHAIN-BASED INTRUSION DETECTION SYSTEM FOR RAILWAY SIGNALS

CROSS REFERENCE TO RELATED APPLICATIONS

The present application claims the benefit of Chinese Patent Application No. 202310138551.3 filed on Feb. 20, 2023, the contents of which are incorporated herein by reference in their entirety.

TECHNICAL FIELD

The invention relates to a technical domain of intrusion detection, specifically to a blockchain-based intrusion detection system for railway signals.

BACKGROUND TECHNOLOGY

The railway signal system has undergone several years of information technology development, leading to a constant improvement in its information technology integration. However, as information technology advances, the system is confronting a growing threat of network attacks, with significant changes in the source, intent, methods, and scale of these attacks.

In the *Cybersecurity Classified Protection Scheme* (version 2.0) and *Cybersecurity requirements for critical information infrastructure protection*, there are explicit guidelines for intrusion prevention. These guidelines necessitate that the system should have the capability to detect, prevent, or mitigate network attack activities, whether they originate externally or internally, especially from critical network nodes. When such attack activities are detected, the system should be capable of logging critical information, including the IP address of the attacker, the attack type, the target of the attack, the time of the attack, and in cases of severe intrusions, it should trigger an alarm.

Intrusion Detection Systems (IDS) are network security devices designed to continuously monitor network traffic and promptly issue alerts or implement proactive response actions when they detect suspicious network transmissions. An intrusion detection system adheres to specific security policies and continually monitors the network and system operating conditions. Its primary objective is to identify various forms of attack attempts, attack behaviors, or the outcomes of attacks, all aimed at safeguarding the Confidentiality, Integrity, and Availability of network system resources.

At present, the intrusion detection systems can be categorized into three distinct types based on their structure: the first type is the centralized intrusion detection system, the second type is the hierarchical intrusion detection system, and the third type is the distributed intrusion detection system.

1. Centralized Intrusion Detection System.

For instance, there is a Chinese invention patent application titled "A centralized intrusion detection system based on a private cloud platform," with the public number CN106961428A.

In a centralized intrusion detection system, the data analysis function is not executed on the monitored host, but on a high-performance central node. This method will not affect the performance of the monitored host and improves the efficiency of system operation.

In a centralized intrusion detection system, the data analysis function is not executed on the monitored host but is carried out on a high-performance central node. This approach will not affect the performance of the monitored host and improves the efficiency of system operation. As data is analyzed centrally, performing global detection and decision-making becomes easier. Additionally, the central station typically enforces more stringent security measures than the monitored hosts, ensuring a more robust implementation of intrusion detection functionality. Centralized policy management guarantees the effectiveness and uniformity of applying security policies. Its drawbacks are primarily associated with the extensive communication between the central station and each host monitoring agent. As the network size expands, a significant volume of audit data and control information must be transmitted between each host monitoring agent and the central station, potentially leading to a substantial reduction in network performance. Furthermore, if the central station becomes failed due to an attack, it could result in the loss of all detection capabilities. Likewise, a single central station encounters challenges in adapting its configuration to the diverse local requirements of all monitored hosts, when introducing new detection issues and models, reconfiguring all monitored hosts to accommodate these changes which can be a complex and challenging process.

2. Hierarchical Intrusion Detection System.

For instance, there is a Chinese invention patent application titled "A Hierarchical Intrusion Detection System Based on Clustering of Relevant Features," with the public number CN1460932A.

Within a hierarchical intrusion detection system, each agent can be independently configured and debugged, and can be installed, run, stopped and uninstalled as required, all without impacting the operation of other agents, and provides a high degree of flexibility. Network traffic for hierarchical intrusion detection systems is moderate, and its impact on the monitored host is contingent on factors such as the number of agents and the complexity of the detection model in use. The shortcomings of the hierarchical intrusion detection system are how to design the corresponding intrusion detection system hierarchy according to the specific network system, select the appropriate agent, and configure the agent's detection model and operating parameters. The drawbacks of the hierarchical intrusion detection system are how to design a suitable intrusion detection system hierarchy tailored to the particular network system, and includes selecting the suitable agents and configuring their detection models and operational parameters. Furthermore, when the network structure undergoes changes, the original hierarchy and upload summarization mechanism must also be adjusted accordingly. When high-level nodes are subjected to attacks or experience failures, relying on low-level nodes for global event analysis and the subsequent identification of intrusion patterns can lead to potential instances of undetected intrusions.

3. Distributed Intrusion Detection System.

For instance, there is a Chinese invention patent application titled "A Correlation-Based Hierarchical Distributed Intrusion Detection System," with the public number CN113965339A.

A distributed intrusion detection system addresses the issues that centralized and hierarchical intrusion detection systems face. In this system, if one or a few detection entities in the network come under attack or fail, each detection entity serves as a smaller functional unit responsible for the overall intrusion detection task. As a result, the overall intrusion detection function is minimally affected. Furthermore, each detection entity has the capability to cross-verify with one another, enabling mutual monitoring and mutual detection. This enhances the system's robustness and reliability. The intrusion detection components on each monitored host can be customized individually to align with the specific needs of the local system, including its applications and security policy requirements. When the network system expands in size, it's only necessary to configure the newly added hosts with the appropriate intrusion detection components. Other hosts besides do not require any modifications to their intrusion detection components. The drawbacks of a distributed intrusion detection system include the necessity for consensus among the detection results of each detection entity and the potential presence of malicious internal nodes. Achieving consensus among the entities can also consume time. The existence of a substantial number of intrusion detection components introduces more potential security vulnerabilities and paths for breaches, thereby raising the risk of intrusion.

SUMMARY OF THE INVENTION

The objective of the present invention is to offer a blockchain-based intrusion detection system designed for railway signals. This system achieves distributed intrusion detection through blockchain technology, circumventing the issues present in the three conventional types of intrusion detection systems. It aims to enhance the reliability and accuracy of intrusion detection schemes and improve the capacity to detect cyber-attacks.

The objective of the present invention is achieved through the following technical solution:

The blockchain-based intrusion detection system for railway signals includes: multiple intrusion detection components are distributed across various business devices within the railway signaling system and the core network. Each intrusion detection component functions as an intrusion detection node within the blockchain. The system log's hash value from the railway signaling system and the hash value of the alarm information output by the intrusion detection node are both uploaded to the blockchain; among them:

Each intrusion detection node incorporates an intrusion detection model. This model is employed to conduct intrusion detection on the system logs within the business device or core network where it is situated. The resulting alarm information indicates whether there is one or more external attack;

A trust evaluation mechanism is established by combining the intrusion detection precision of each intrusion detection node. The intrusion detection node chosen by this trust evaluation mechanism employs a consensus mechanism to verify the alarm information and achieve a unified representation of the intrusion detection results.

The above-described technical solution offered by this invention is built on a blockchain's distributed chain structure without a central, trusted control center. This design avoids that centralized intrusion detection centers failure due to malicious attack. Additionally, utilizing a blockchain-based distributed structure also eliminates the risk of a single point of failure for the intrusion detection center. Furthermore, the blockchain's hash encryption features make it highly challenging to maliciously tamper with the data within the blockchain-based intrusion detection system. This, in turn, guarantees the security and availability of the system's data. The intrusion detection model is employed to fend off external network attacks. Additionally, the parameters of the high-performing intrusion detection nodes within the blockchain-based intrusion detection system are synchronized with other intrusion detection nodes on the blockchain. This further bolsters the overall effectiveness of the entire blockchain-based intrusion detection system in thwarting external attacks. The blockchain node trust evaluation mechanism is employed to assess the trustworthiness of the intrusion detection nodes. This helps prevent internal malicious actors from disrupting the consensus among the intrusion detection nodes, which could otherwise impact intrusion detection performance. The consensus mechanism of the blockchain is utilized to facilitate agreement among the intrusion detection nodes, resulting in a unified representation of the detection results.

DESCRIPTION OF FIGURES

To better illustrate the technical solutions in the embodiments of the present invention, the following section briefly introduces the accompanying drawings required for describing the embodiments. It is important to note that the accompanying drawings presented in the subsequent descriptions are only a subset of the embodiments, and individuals with ordinary skills in this field can derive additional accompanying drawings based on these illustrations without requiring creative effort.

DETAILED DESCRIPTION

A clear and complete description of the technical scheme of the embodiments of the Invention will be given below in conjunction with the appended drawings in which the embodiments of the present Invention are described, and it will be apparent that the described embodiments are only part of, and not all of, the embodiments of the Invention. Based on the embodiments of the present Invention, all other embodiments obtained by those of ordinary skill in the art without making creative efforts fall within the protection scope of the present Invention.

First, the terms that may be used in this article are explained as follows:

The term "and/or" means that either or both of them can be realized at the same time. For example, X and/or Y means that it includes both the situation of "X" or "Y" and the three situations of "X and Y".

The terms "involving", "including", "containing", "having" or other descriptions with similar meanings shall be construed as non-exclusive inclusion. For example, involving a technical characteristic element (such as raw material, constituent, ingredient, carrier, dosage form, material, size, part, component, mechanism, device, step, process, method, reaction condition, processing condition, parameter, algorithm, signal, data, product, etc.) should be interpreted as including not only a technical characteristic element explicitly listed, but also other technical characteristic elements well known in the art that are not explicitly listed.

The following offers a comprehensive overview of a railway signal intrusion detection system based on blockchain technology as provided by the present invention. In cases where aspects are not extensively elaborated on in the embodiments of this invention, it is assumed that they are common technologies among technicians in the field. In cases where specific conditions are not explicitly mentioned in the embodiments of this invention, they should adhere to the standard conditions within the industry or those suggested by the manufacturer.

Figure 1:
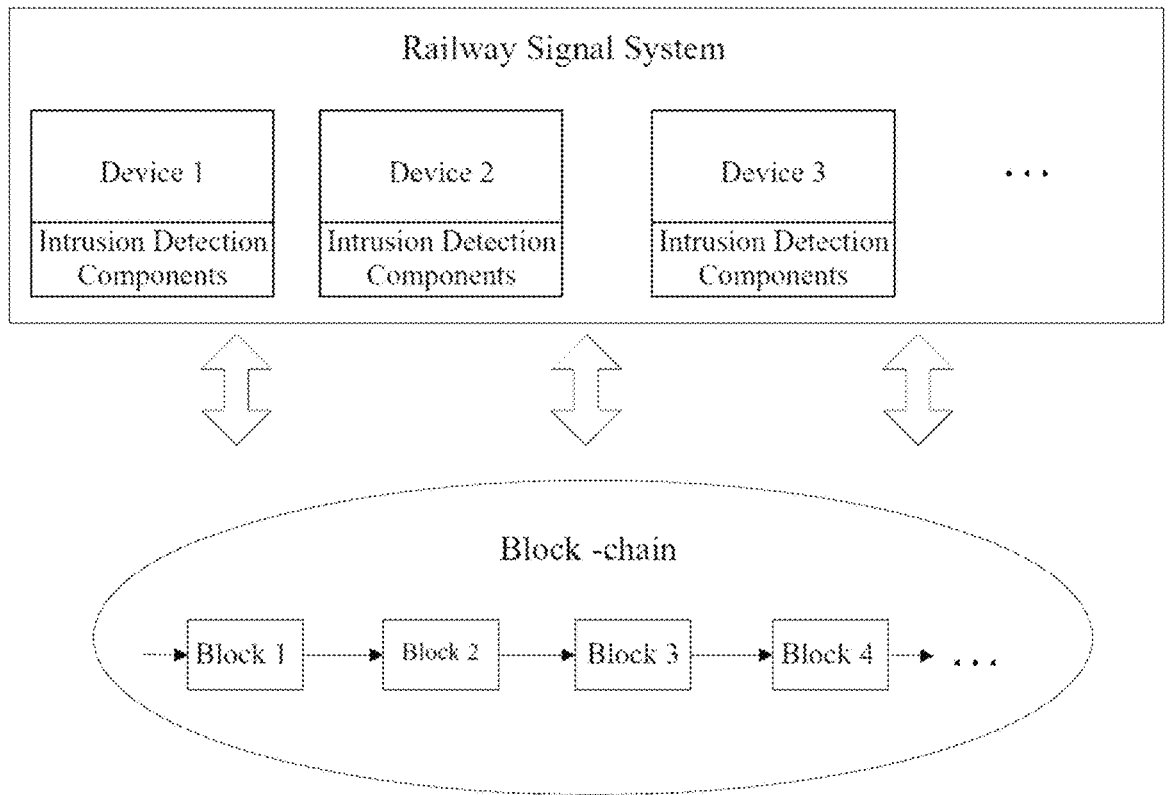
FIG. 1 depicts a schematic diagram illustrating a blockchain-based railway signal intrusion detection system as provided by the embodiments of the present invention.

The present invention introduces a blockchain-based railway signal intrusion detection system, as depicted in FIG. 1, which includes multiple intrusion detection components distributed across various business devices within the railway signaling system and the core network. Each intrusion detection component functions as an intrusion detection node within the blockchain. The system log's hash value from the railway signaling system and the hash value of the alarm information out by the intrusion detection node are both uploaded to the blockchain. Among them, each intrusion detection node incorporates an intrusion detection model. This model is employed to conduct intrusion detection on the system logs within the business device or core network where it is situated. The resulting alarm information indicates whether there is one or more external attack. A trust evaluation mechanism is established by combining the intrusion detection precision of each intrusion detection node. The intrusion detection node chosen by this trust evaluation mechanism employs a consensus mechanism to verify the alarm information and achieve a unified representation of the intrusion detection results.

Figure 2:
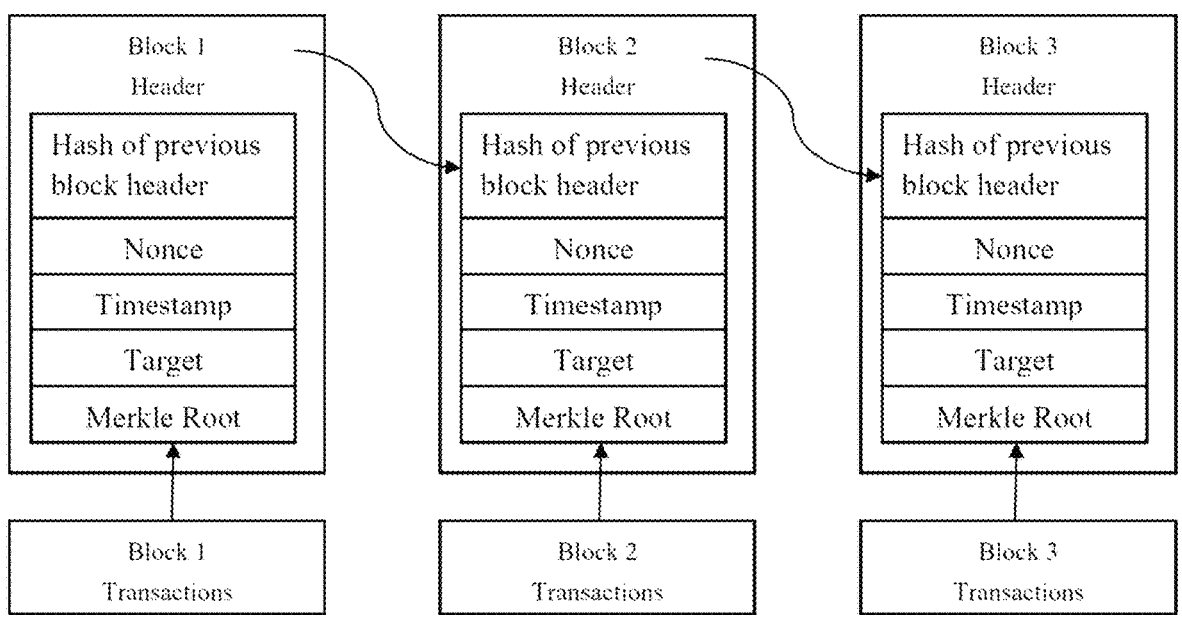
FIG. 2 depicts a schematic diagram illustrating the structure of a blockchain as provided by the embodiments of the present invention.

The system described in the embodiments of this invention employs a blockchain-based distributed architecture, illustrated in FIG. 2. This approach avoid the risks associated with a centralized intrusion detection center being compromised due to malicious attacks. Furthermore, the blockchain's distributed structure eliminates the potential for a single point of failure within the intrusion detection center. The blockchain's hash encryption features make it highly challenging to maliciously tamper with the data within the blockchain-based intrusion detection system. This, in turn, guarantees the security and availability of the system's data.

Taking a typical signal control system as an illustration, intrusion detection components are installed in every device within the signal control system and the core network. In this scenario, the intrusion detection components function as host-based intrusion detection components situated within each business device of the signal control system. They gather network traffic and behavioral information. Additionally, network-based intrusion detection components are installed in the core network, in either a mirrored or cascaded configuration, to gather network traffic and behavioral information. In the embodiments of the present invention, the integration of traffic and behavioral information is collectively termed "system logs."

Figure 3:
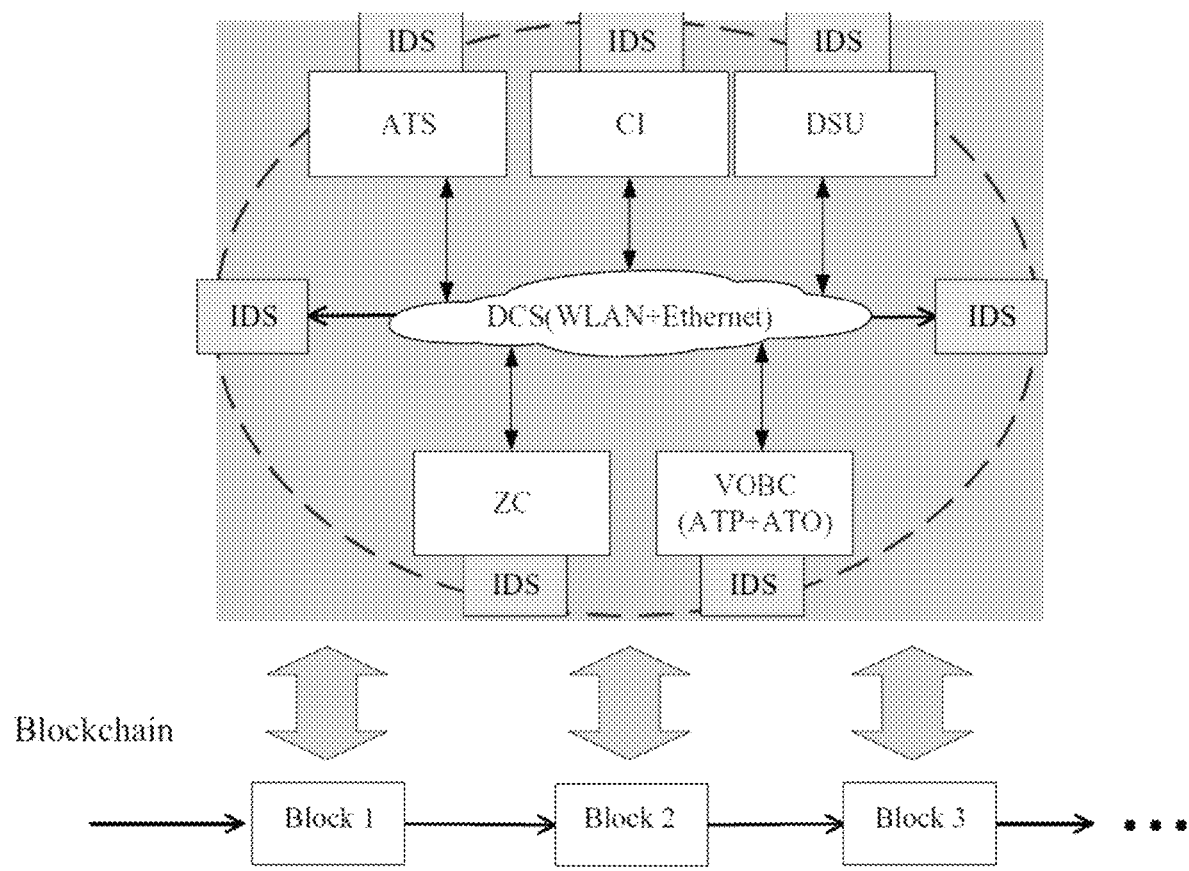
FIG. 3 depicts a schematic diagram illustrating a specific application deployment of a blockchain-based railway signal intrusion detection system as provided by the embodiments of the present invention.

As depicted in FIG. 3, using the Communication Based Train Control System (CBTC) as an illustration, the intrusion detection component is deployed on the smallest business device. Among them, the business function modules, including Automatic Train Supervision System (ATS), Computer Interlocking System (CI), Data Storage Unit (DSU), Zone Controller (ZC), and Vehicle-On Board Controller (VOBC), are deployed on respective servers to create the business device. They are interconnected through the Data Communication System (DCS) network. Furthermore, the VOBC encompasses Automatic Train Protection System (ATP) and Automatic Train Operation System (ATO), The DCS network encompasses WLAN (Wireless Local Area Network) and Ethernet components. Intrusion Detection System (IDS) devices or components are installed in both the business device and communication networks, and deploy the intrusion detection models in the IDS device. The intrusion detection model can take the form of a knowledge-based intrusion detection rule base or an artificial intelligence detection model based on machine learning. The intrusion detection model is responsible for identifying abnormal network behavior or potential attacks, including activities like port scanning, Trojan horse attacks, DOS/DDOS attacks (denial-of-service attacks), buffer overflow attacks, network worm activity, file vulnerability exploits, and application-layer security vulnerabilities by analyzing system logs. The incorporation of blockchain technology involves storing the hash values of system logs, alert information, and the detection model parameters as transaction data on the blockchain. This data is shared across all the blocks in the chain. Data generated and stored by the blockchain is secure and tamper-proof, ensuring the integrity and trustworthiness of the data. The blockchain's consensus mechanism is the cornerstone for upholding data security, guaranteeing that intrusion detection nodes sort and execute received transactions to attain consensus within a distributed network.

To better illustrate the technical solutions and resulting technical effects provided by this invention, a detailed description of a blockchain-based railway signal intrusion detection system, as presented in the embodiments, will be provided through specific examples.

I. Overview of the System.

The railway signal intrusion detection system, based on blockchain as described in the embodiments of this invention, has the capability to combat various forms of attacks. This includes external threats like DOS/DDOS attacks (denial-of-service attacks), port scanning attacks, cache overflow attacks, and other common attacks, as well as dealing with internal nodes that may initiate malicious attacks. Given that all intrusion detection components function as intrusion detection nodes within the blockchain, they will be collectively referred to as intrusion detection nodes in the following descriptions for the sake of consistency.

Figure 4:
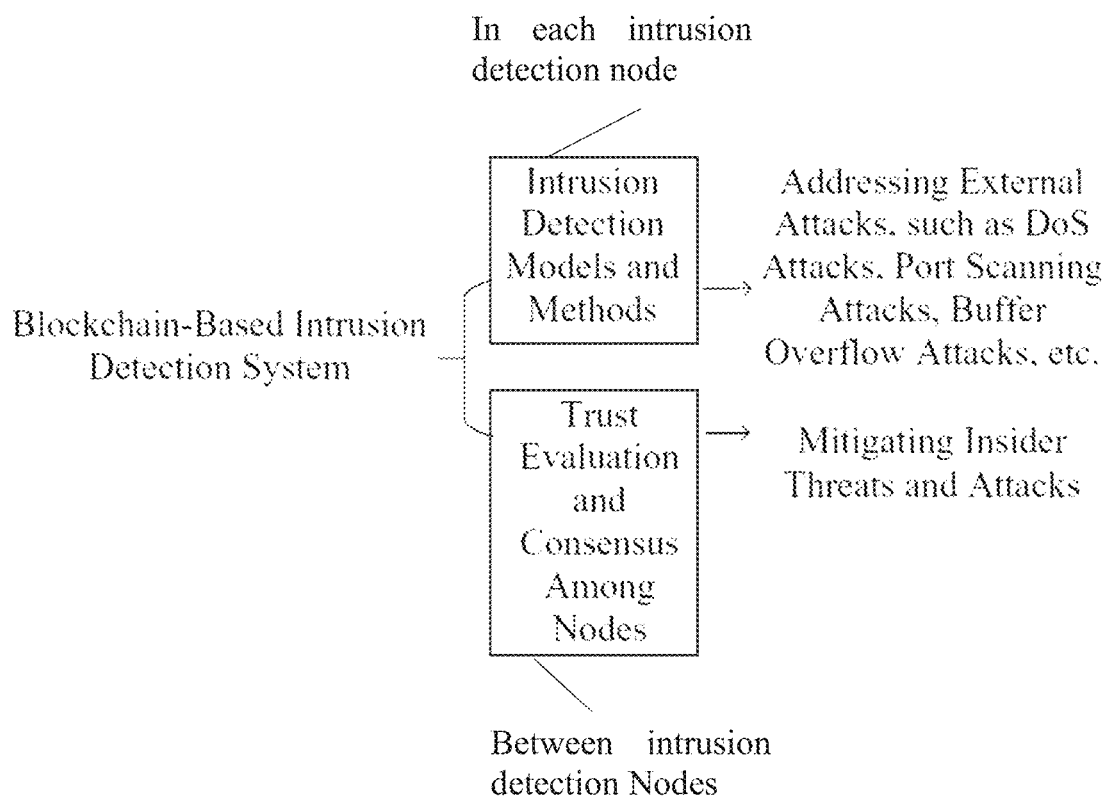
FIG. 4 depicts a schematic diagram illustrating the functional principles of a blockchain-based railway signal intrusion detection system as provided by the embodiments of the present invention.

Each blockchain intrusion detection node can share its intrusion detection model parameters with other intrusion detection nodes. Additionally, it can utilize the mutual evaluation mechanism between nodes to achieve trusted evaluation and consensus reaching of nodes, thereby achieving unified representation of the intrusion detection results. FIG. 4 illustrates the functional principles of the blockchain-based railway signal intrusion detection system.

II. Program for Defending Against External Attacks.

The approach for countering external attacks, as detailed in this section, corresponds to the intrusion detection model and method outlined in FIG. 4. This entails thwarting external attacks through the intrusion detection model implemented within the intrusion detection node, in conjunction with the supporting measures.

Figure 5:
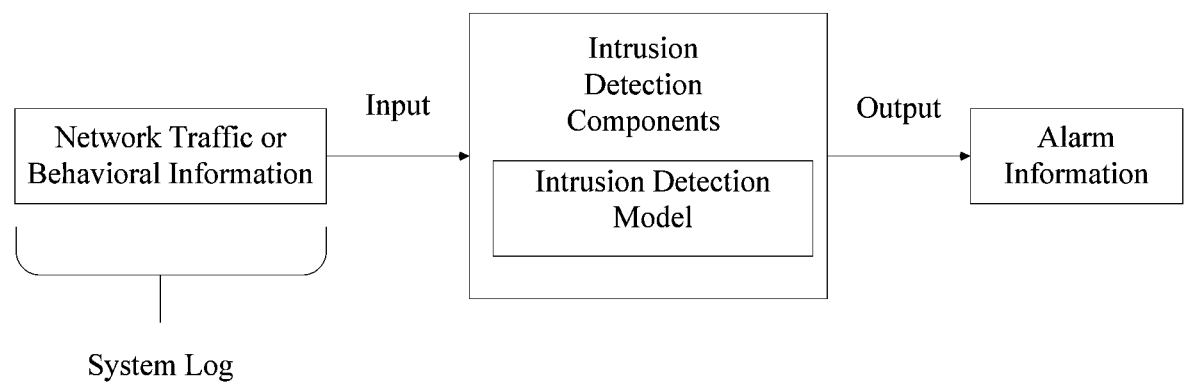
FIG. 5 depicts a schematic diagram illustrating the basic principle of an intrusion detection component as provided by the embodiments of the present invention.

As previously explained, the intrusion detection model can take the form of a knowledge base based intrusion detection rule base or an artificial intelligence detection model based on machine learning. FIG. 5 illustrates the fundamental principle of intrusion detection nodes. Each intrusion detection node can achieve parameter sharing by uploading the rule base model parameters or machine learning model parameters from its own intrusion detection model. Given the substantial volume of system logs and alarm information generated by the system, uploading all of it to the blockchain would consume significant communication time and bandwidth resources. Therefore, solely the hash values of system logs and alarm information are packaged and uploaded to the blockchain and are accessible and utilized by all intrusion detection nodes. The characteristics of the hash function enable the rapid detection of any tampering or deletion of system logs and alert information. Furthermore, the system logs are shared among all intrusion detection nodes on the blockchain, allowing the intrusion detection nodes to assess and verify alert information based on the complete system logs.

As technicians in the field would comprehend, a blockchain is a chain-like structure formed by a sequential of blocks. Every block in the chain contains a hash value of all preceding transactions, making it simpler to identify data tampering or loss and deterring disavowal.

In the embodiment of the present invention, each intrusion detection node autonomously employs its intrusion detection model for intrusion detection. The intrusion detection model can be conceptualized as a function with system logs as input and alert messages as output. The alert message signifies the presence or absence of an external attack and records the associated system logs, which can correspond to a single system log or multiple system logs.

If the intrusion detection model of an intrusion detection node, referred to as Node A, exhibits the highest level of intrusion detection precision, the remaining intrusion detection nodes utilize the acquired system logs to validate Node A's intrusion detection model's accuracy. After this verification and confirmation process involving all intrusion detection nodes, it is established that the parameters of Node A's intrusion detection model represent the optimal model parameters. These model optimal parameters are then recorded within the blockchain by a selected accounting node, allowing them to be accessible and used by all intrusion detection nodes.

In the embodiment of this invention, each intrusion detection node uploads its own alarm information, which is then verified by all the intrusion detection nodes. Ultimately, a designated accounting node processes this alarm information along with the hash value of the corresponding system logs. These components are packaged together with the optimal model parameters and recorded in the blockchain. In the subsequent block, the newly selected accounting node hashes the newly accumulated system logs and alarm information, and then records the calculated hash value alongside the updated optimal model parameters within the block.

When the intrusion detection model is an artificial intelligence detection model based on machine learning, model training and test validation can be conducted using the confirmed alarm information present on the blockchain. The confirmed alarm information pertains to the alarm data that has undergone the consensus mechanism to establish a unified representation.

Under normal circumstances, the intrusion detection node with the highest accuracy in blockchain has a greater probability of winning the accounting right, i.e. intrusion detection node that wins the accounting right is the accounting node. In the embodiments of this invention, we introduce a counter. This counter can be deployed within the blockchain through the use of a smart contract. When the intrusion detection node with the highest accuracy in intrusion detection continuously secures the accounting right and reaches a certain threshold on the counter, that specific intrusion detection node is excluded from the process of competing for the accounting node for a designated period. This is a preventive measure to avoid situations where intrusion detection nodes with consistently high detection rate dominate the accounting right, which could potentially impact the robustness of the blockchain. Winning the accounting right signifies that the respective intrusion detection node is designated as the accounting node.

III. Program for Preventing Internal Attacks and Accomplishing Consistent Intrusion Detection.

In this embodiment of the present invention, the utilization of a trust evaluation mechanism resolves the issue of internal node malicious attacks, while the consensus mechanism serves a dual purpose: electing the accounting node and ensuring consistent intrusion detection.

This aspect of the scheme is implemented using the trust evaluation and consensus mechanism of the nodes described in FIG. 4.

As mentioned earlier, the intrusion detection system in the present invention utilizes a blockchain-distributed chain structure without a trusted center. Consequently, the evaluation of trust among intrusion detection nodes becomes a central concern in the blockchain-based intrusion detection system. Opting for intrusion detection nodes with a higher level of trust to engage in the consensus process can effectively address the issue of internal malicious attacks. This approach prevents the disruptions caused by internal malicious actions that might hinder the consensus among nodes, ultimately preserving the performance of intrusion detection. The trust evaluation between intrusion detection nodes still faces the following problems: a) how to dynamically evaluate the trust of intrusion detection nodes to ensure the trustworthiness of intrusion detection nodes in the consensus process; b) how to reward and punish the trust of nodes to incentivize nodes to perform honest behaviors and reduce node error behaviors; and c) how to prevent the intrusion detection nodes with a high degree of trust from evil behaviors.

The following sections will introduce the trust evaluation mechanism and consensus mechanism separately.

1. Trust Evaluation Mechanism.

To address the aforementioned issues a) to c), the embodiments of the present invention provide the following solution:

1) Implementing a Node Reward and Penalty System and a Node Trust Blacklist System.

In the embodiments of the present invention, to incentivize honest behavior and reduce errors among intrusion detection nodes, a system is introduced that consists of a node reward and penalty mechanism, along with a node trust blacklist mechanism. More specifically:

The node reward and penalty mechanism is used to reward and penalize intrusion detection nodes based on their intrusion detection precision. This mechanism adjusts the trust weight of intrusion detection nodes and combines it with a node trust blacklist mechanism to categorize intrusion detection nodes into trusted and untrusted nodes. Specifically, when the intrusion detection precision of a node is higher than a predetermined threshold, it indicates that the node consistently produces accurate alert information. In this case, the intrusion detection node is rewarded by increasing its trust weight. The higher the trust weight, the higher the chances of gaining accounting rights. Conversely, when the intrusion detection precision of a node falls below the predetermined threshold, it suggests that the intrusion detection node is behaving abnormally or continuously producing false alerts (e.g., the multiple consecutive alarm messages that are being generated are all erroneous detection results, such as continuous false positives or false alarms). In this situation, the intrusion detection node is penalized by reducing its trust weight. When the trust weight drops to a set lower limit (which can be determined based on practical considerations or experience), the corresponding intrusion detection node is placed on a blacklist.

Intrusion detection nodes that are not on the blacklist are considered trusted nodes. Any intrusion detection nodes on the blacklist are categorized as untrusted nodes. Untrusted nodes are not eligible to compete for the accounting rights and are excluded from the node consensus process. Nonetheless, the intrusion detection nodes that have been blacklisted still continue to function as nodes within the blockchain, responsible for storing of complete block transactions. After a predefined period of time, denoted as "11" (the specific duration can be adjusted based on practical circumstances or experience), if these blacklisted intrusion detection nodes exhibit normal behavior (the multiple consecutive alarm messages being output are all accurate detection results, and it is the same as the result corresponding to the unified representation of the intrusion detection result), they will be taken off the blacklist and reinstated as trusted nodes.

In the implementation of this invention, an incorrect detection result refers to a situation where the output alarm information from the intrusion detection node does not match the outcome indicated by a unified representation of the intrusion detection result.

Simultaneously, the trust weight of the node is continuously assessed to ensure the node's reliability throughout the consensus process. The node trust function design is presented, and this trust function for intrusion detection nodes changes dynamically, taking into account intrusion detection precision and time, which can be expressed as follows: Trust_score=$f(d,t_2)$, where "$f$" represents the trust weight calculation function, "d" signifies the intrusion detection precision of the intrusion detection node, "$t_2$" stands for time, and "Trust_score" denotes the trust weight. The trust weight is influenced differently by varying time intervals. The farther the time is, the less it affects the trust weight, while the closer the time is, the greater the impact on the trust weight. Furthermore, a higher intrusion detection rate of the intrusion detection node leads to an increased trust weight for the node. Indeed, the trust weight of the node decreases as the node's detection rate declines.

2) Introduction of Counters.

In this embodiment of the present invention, to safeguard against any malicious behavior by nodes with high trust levels, a counter is introduced to keep track of the repeated instances of the same accounting node. Specifically:

When an intrusion detection node with a high detection rate consistently secures accounting rights (i.e., is repeatedly chosen as an accounting node) and surpasses a predefined counter threshold (which can be adjusted based on practical circumstances or experience), the corresponding intrusion detection node is temporarily disqualified from participating in the competition for accounting rights for a predetermined period of time. The objective is to prevent nodes with consistently high detection rates from winning accounting rights continuously, which could lead to an imbalanced weight distribution. This measure aims to deter the associated intrusion detection nodes from potentially engaging in sudden malicious activities, thereby safeguarding the robustness and reliability of the blockchain. Smart contracts on the blockchain are designed to implement the counter function. A smart contract is essentially a set of predefined rules, and it can automatically execute when the specified conditions are met. In the embodiment of this invention, with each synchronized consensus completion, a counter increment is initiated. When the continuous count of a particular intrusion detection node reaches the predefined counter threshold, that specific intrusion detection node is temporarily disqualified from participating in the competition for accounting rights for a duration of time denoted as "$t_3$" (the specific duration can be adjusted based on practical circumstances or experience).

In the embodiment of this invention, the intrusion detection node that wins the accounting rights will see an increase in its trust level within the entire blockchain network. This, in turn, contributes to enhancing the accuracy and robustness of the entire detection system. Simultaneously, based on the node trust function design, only nodes with higher intrusion detection precision stand a better chance of securing the accounting rights. Moreover, the incorporation of counters serves to limit the emergence of nodes with overly high trust weights, thereby promoting the establishment of a robust and balanced blockchain network.

2. Consensus Mechanism.

Traditional blockchain consensus mechanisms encompass a range of approaches, such as PoW (Proof of Work), POS (Proof of Stake), Algorand, PBFT (Practical Byzantine Fault Tolerance), and more.

In the embodiment of this invention, the consensus mechanism primarily serves the purpose of electing accounting nodes and ensuring consistent intrusion detection. Differing from traditional blockchain consensus mechanisms, the present invention employs an enhanced consensus mechanism, wherein the impact factor is substituted with the trust weight. Specifically:

1) In the process of selecting an accounting node, the trust weight functions as an influencing factor, and the intrusion detection nodes collaboratively reach a consensus to choose the accounting node. The trust weight is linked to the intrusion detection precision of the intrusion detection node. The higher the detection accuracy of the intrusion detection node, the larger the trust weight it acquires, resulting in a higher likelihood of winning the accounting rights and a greater chance of becoming an accounting node.

Taking the POS (Proof of Stake) consensus mechanism as an example, the transformation involves replacing the influence factor with the trust weight. In this case, the competition to secure accounting rights proceeds as follows: Each intrusion detection node computes a random number that meets the difficulty value condition. The higher the trust weight, the lower the calculation difficulty. The intrusion detection node that first achieves the desired result, as confirmed by consensus, wins the accounting rights.

2) In the process of achieving consistent intrusion detection, the decision-making consensus is a collaborative effort among intrusion detection nodes to establish a unified representation of the intrusion detection results.

For instance, let's consider the current intrusion detection node B. It conducts intrusion detection on the system log B1 within the business device or core network it's situated in and subsequently output corresponding alarm information B2. Similarly, each elected intrusion detection node independently carries out intrusion detection on the system log B1, validates the alarm information B2, and, through collaborative decision-making, establishes a unified representation of the intrusion detection results. For instance, this consensus can be achieved using a voting mechanism, with the result garnering the highest number of votes serving as the unified representation of the intrusion detection results. The unified representation of the intrusion detection results is a verified alarm message that can be retained for further training and detection purposes.

By relying on the unified representation of the intrusion detection results, it is also feasible to assess whether the intrusion detection node is generating erroneous detection outcomes and to gauge the intrusion detection precision of the intrusion detection node.

The intrusion detection nodes involved in the two aspects of the consensus decision described above are all the intrusion detection nodes chosen through the trust evaluation mechanism mentioned earlier, which means all the intrusion detection nodes are not listed in the blacklist.

In the embodiment of this invention, apart from the modification of the influence factor to the trust weight within the improved consensus mechanism, the remainder of the decision-making formula process can reference the relevant existing procedures, thus eliminating the need for redundant steps.

In the above embodiments of this invention, the specific values associated with various thresholds, preset values, lower limits, and other parameters can be determined by technicians in the field based on real-world considerations or experience. The invention is not confined to specific numerical values.

Technicians in the field will easily grasp that the division of the functional modules described above is for the sake of clarity and simplicity. In practical application, as per the requirements of these functions, they can be assigned to different functional modules to accomplish the overall or partial functionality. In other words, the internal structure of the system is segmented into distinct functional modules to fulfill the functions described above.

The above is only a preferred embodiment of the present Invention, but the scope of protection of the present Invention is not limited thereto, and any changes or substitutions that can easily be figured out by those skilled in the art within the technical scope disclosed by the present Invention should be covered within the protection scope of the present Invention. Therefore, the scope of protection of the present Invention should be subject to the scope of protection of the claims.

What is claimed is:

1. A blockchain-based intrusion detection system for railway signal, comprising:
a plurality of intrusion detection components that are distributed across hardware processors of various business devices within a railway signaling system and a core network, wherein each intrusion detection component functions as an intrusion detection node within a blockchain, a hash value of a system log from the railway signaling system and a hash value of alarm information output by the intrusion detection node are both uploaded to the blockchain; wherein:
each intrusion detection node incorporates an intrusion detection model, the intrusion detection model is employed to conduct intrusion detection on the system log within a business device or the core network where the intrusion detection node is situated, the alarm information output indicates whether there is an external attack;
a trust evaluation program is established by combining intrusion detection precision of each intrusion detection node, the intrusion detection node chosen by the trust evaluation program employs a consensus program to verify the alarm information and achieve a unified representation of intrusion detection results;
wherein the trust evaluation program comprises: a node reward and punishment program and a node trust blacklist program;
wherein the node reward and punishment program is used to reward and penalize the intrusion detection node based on the intrusion detection precision thereof, that is, adjusts a trust weight of the intrusion detection node, and combines the trust weight with the node trust blacklist program to categorize intrusion detection nodes into trusted nodes and untrusted nodes, and a trusted node is the intrusion detection node selected by the trust evaluation program.

2. The blockchain-based intrusion detection system for railway signal according to claim 1, wherein the intrusion detection model is a knowledge-based intrusion detection rule base or an artificial intelligence detection model based on machine learning, when the intrusion detection model is the artificial intelligence detection model based on machine learning, model training and test validation is conducted using confirmed alarm information present on the blockchain.

3. The blockchain-based intrusion detection system for railway signal according to claim 2,
wherein when the intrusion detection model of one of all intrusion detection nodes, referred to as a node A, exhibits a highest level of the intrusion detection precision, remaining intrusion detection nodes validate an accuracy of the intrusion detection model of the node A, after a verification and confirmation process involving all the intrusion detection nodes, parameters of the intrusion detection model of the node A are established to represent optimal model parameters, the optimal model parameters are then recorded within the blockchain by a selected accounting node, and shared by all the intrusion detection nodes.

4. The blockchain-based intrusion detection system for railway signal according to claim 1, wherein rewarding and penalizing the intrusion detection node based on the intrusion detection precision thereof, and combining the trust weight with the node trust blacklist program to categorize the intrusion detection nodes into the trusted nodes and the untrusted nodes comprises:
when the intrusion detection precision of the intrusion detection node is higher than a predetermined threshold, the intrusion detection node is rewarded and the trust weight of the intrusion detection node is raised, the higher the trust weight is, the higher a chance of gaining an accounting right is; when the intrusion detection precision of the intrusion detection node falls below the predetermined threshold, the intrusion detection node is penalized and the trust weight of the intrusion detection node is lowered, when the trust weight drops to a set lower limit, a corresponding intrusion detection node is placed on a blacklist,
intrusion detection nodes that are not on the blacklist are the trusted nodes, intrusion detection nodes on the blacklist are categorized as the untrusted nodes.

5. The blockchain-based intrusion detection system for railway signal according to claim 4, wherein the trust weight adopts a dynamic evaluation method, which is expressed as:

$$\text{Trust\_score} = f(d, t_2)$$

where, $f$ is a trust weight calculation function, d is the intrusion detection precision of the intrusion detection node, $t_2$ is a time, Trust_score is the trust weight, the trust weight is influenced differently by varying time, the farther the time is, the less the time affects the trust weight, while the closer the time is, the greater the time affects the trust weight; and the higher a detection rate of the intrusion detection node is, the greater the trust weight is, and conversely, the lower the trust weight is.

6. The blockchain-based intrusion detection system for railway signal according to claim 4, wherein when the intrusion detection node is placed into a blacklist, and after a predefined period of time, denoted as "$t_1$", when the intrusion detection node exhibits normal performance, the intrusion detection is taken off the blacklist and reinstated as the trusted node, the normal performance refers to results expressed by a plurality of continuous alarm messages output by the intrusion detection node are same as corresponding results of the unified representation of the intrusion detection results.

7. The blockchain-based intrusion detection system for railway signal according to claim 4, after the intrusion detection node is chosen through the trust evaluation program involves, comprising: choosing an accounting node via the consensus program, the consensus program takes into account the trust weight as an influencing factor thereof, employing a competitive process to determine who gets an accounting right, and, the greater the trust weight of the intrusion detection node is, the higher a probability that the intrusion detection node obtains the accounting right is.

8. The blockchain-based intrusion detection system for railway signal according to claim 7, wherein the trust evaluation program also includes a counter that counts a same accounting node, when the intrusion detection node consistently wins the accounting right and reaches a predefined counter threshold, the intrusion detection node is excluded from participating in competition for the accounting node within a scheduled time, wining the accounting right signifies that a corresponding intrusion detection node is selected as the accounting node.

9. The blockchain-based intrusion detection system for railway signal according to claim 4, wherein the intrusion detection node chosen by the trust evaluation program employing the consensus program to verify the alarm information and achieving the unified representation of the intrusion detection results comprises:

for a current intrusion detection node B, after performing intrusion detection on a system log B1 of the business device or the core network, outputting corresponding alarm information B2, each intrusion detection node selected through the trust evaluation program detects the system log B1 respectively, validates the alarm information B2, and, through collaborative decision-making, establishes the unified representation of the intrusion detection results.

10. The blockchain-based intrusion detection system for railway signal according to claim 1, wherein the trust weight adopts a dynamic evaluation method, which is expressed as:

$$\text{Trust\_score} = f(d, t_2)$$

where, $f$ is a trust weight calculation function, d is the intrusion detection precision of the intrusion detection node, $t_2$ is a time, Trust_score is the trust weight, the trust weight is influenced differently by varying time, the farther the time is, the less the time affects the trust weight, while the closer the time is, the greater the time affects the trust weight; and the higher a detection rate of the intrusion detection node is, the greater the trust weight is, and conversely, the lower the trust weight is.

11. The blockchain-based intrusion detection system for railway signal according to claim 1, wherein when the intrusion detection node is placed into a blacklist, and after a predefined period of time, denoted as "$t_1$", when the intrusion detection node exhibits normal performance, the intrusion detection is taken off the blacklist and reinstated as the trusted node, the normal performance refers to results expressed by a plurality of continuous alarm messages output by the intrusion detection node are same as corresponding results of the unified representation of the intrusion detection results.

12. The blockchain-based intrusion detection system for railway signal according to claim 1, after the intrusion detection node is chosen through the trust evaluation program involves, comprising: choosing an accounting node via the consensus program, the consensus program takes into account the trust weight as an influencing factor thereof, employing a competitive process to determine who gets an accounting right, and, the greater the trust weight of the intrusion detection node is, the higher a probability that the intrusion detection node obtains the accounting right is.

13. The blockchain-based intrusion detection system for railway signal according to claim 12, wherein the trust evaluation program also includes a counter that counts a same accounting node, when the intrusion detection node consistently wins the accounting right and reaches a predefined counter threshold, the intrusion detection node is excluded from participating in competition for the accounting node within a scheduled time, wining the accounting right signifies that a corresponding intrusion detection node is selected as the accounting node.

14. The blockchain-based intrusion detection system for railway signal according to claim 1, wherein the intrusion detection node chosen by the trust evaluation program employing the consensus program to verify the alarm information and achieving the unified representation of the intrusion detection results comprises:

for a current intrusion detection node B, after performing intrusion detection on a system log B1 of the business device or the core network, outputting corresponding alarm information B2, each intrusion detection node selected through the trust evaluation program detects the system log B1 respectively, validates the alarm information B2, and, through collaborative decision-making, establishes the unified representation of the intrusion detection results.

15. The blockchain-based intrusion detection system for railway signal according to claim 1, wherein when the intrusion detection model of an intrusion detection node, referred to as a node A, exhibits a highest level of the intrusion detection precision, remaining intrusion detection nodes validate an accuracy of the intrusion detection model of the node A, after a verification and confirmation process involving all intrusion detection nodes, parameters of the intrusion detection model of the node A are established to represent optimal model parameters, the optimal model parameters are then recorded within the blockchain by a selected accounting node, and shared by all the intrusion detection nodes.

* * * * *